United States Patent [19]
Bruno

[11] Patent Number: 5,832,146
[45] Date of Patent: Nov. 3, 1998

[54] MULTI-WAVELENGTH FILTER THAT IS INSENSITIVE TO POLARIZATION WITH MEANS FOR CREATING ASYMMETRY IN THE REFRACTIVE INDEX OF WAVEGUIDES AND METHOD OF MANUFACTURE

[75] Inventor: Adrien Bruno, Palaiseau, France

[73] Assignee: France Telecom, France

[21] Appl. No.: 627,492

[22] Filed: Apr. 4, 1996

[30]     Foreign Application Priority Data

Apr. 4, 1995 [FR] France ................................. 95 03945

[51] Int. Cl.$^6$ ...................................................... G02B 6/00
[52] U.S. Cl. ............................................................... 385/11
[58] Field of Search ............................... 385/11, 28, 147, 385/901; 372/2; 343/895

[56]     References Cited

U.S. PATENT DOCUMENTS 4,761,049  8/1988  Burns et al. ............................. 385/40
4,779,277  10/1988  Gover et al. ............................. 372/2
5,185,828  2/1993  Van Der Tol ............................. 385/28

*Primary Examiner*—Akm E. Ullah
*Attorney, Agent, or Firm*—Blakely Sokoloff Taylor & Zafman

[57]     ABSTRACT

The invention relates to a multi-wavelength filter that is insensitive to polarization, comprising a bundle of optical waveguides made on a common substrate and organized in such a manner that the wavelength response of the filter depends on the phase shifting to which the light propagating in the waveguides is subject. The filter also comprises polarization rotators placed on the path of the light in such a manner that in each of the optical waveguides the light paths for the TE and TM polarization modes are of equal length. The polarization rotators are of the type comprising means for loading each optical waveguide and for creating asymmetry in the effective refractive index thereof.

12 Claims, 2 Drawing Sheets

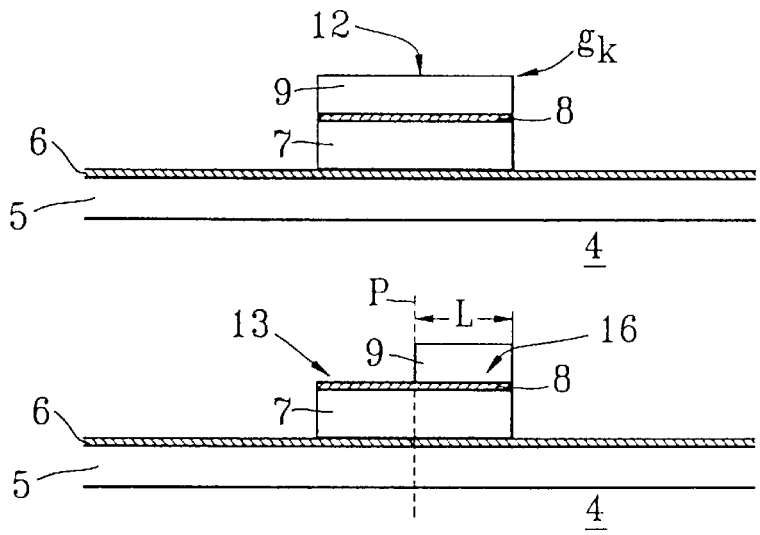
FIG. 4
FIG. 5
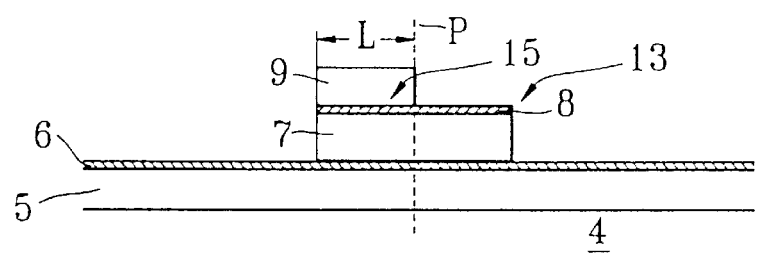
FIG. 6
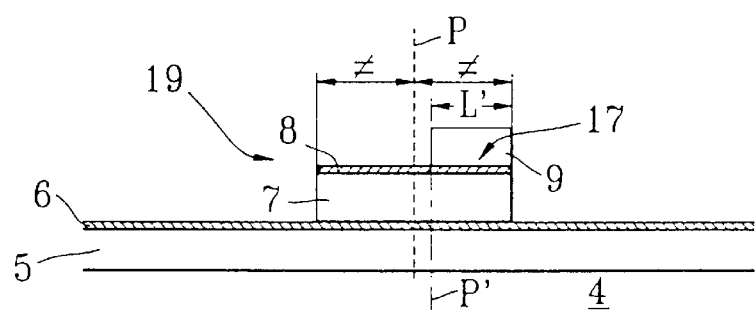
FIG. 7
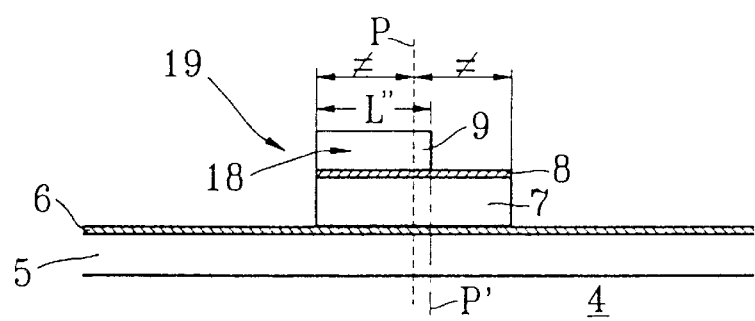
FIG. 8
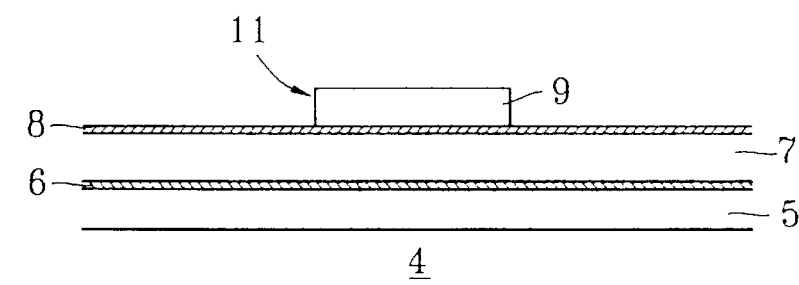
FIG. 9

MULTI-WAVELENGTH FILTER THAT IS INSENSITIVE TO POLARIZATION WITH MEANS FOR CREATING ASYMMETRY IN THE REFRACTIVE INDEX OF WAVEGUIDES AND METHOD OF MANUFACTURE

The present invention relates to the general technical field of opto-electronics, and more precisely to a multi-wavelength filter of the type comprising a bundle of optical waveguides made on a common substrate, and organized in such a manner that the wavelength response of the filter depends on the phase shifting to which the light propagating in its waveguides is subject.

BACKGROUND OF THE INVENTION

Various technological approaches have been proposed for making such a multi-wavelength filter independent of polarization.

In this respect, mention may be made of the publication "Polarization-independent InP-based phased-array wavelength demultiplexer with flattened wavelength response" by L. H. Spiekmann et al., ECOC 94 Conference.

Thus, as mentioned in the above-specified article, a structure has been proposed in which a half-wave quartz plate is placed halfway along the optical waveguide bundle to interchange the TE and TM polarization modes.

In an article by Zirngibl et al., entitled "Polarization-independent 8×8 waveguide grating multiplexer on InP", published in Electronic Letters, Vol. 29, pages 201–202, January 1993, it is proposed to use different orders for the TM and TE polarization modes.

Mention may also be made of a method that consists in spatially separating the TE and TM polarization modes, as proposed by M. R. Amersfoort et al. in an article entitled "A phased-array wavelength demultiplexer with flattened wavelength response", published in Electronic Letters, Vol. 30, 1994.

Mention may also be made of a method that consists in spatially separating the TE and TM polarization modes while taking different orders into consideration, as proposed by Spiekmann et al., in the first above-mentioned article.

The above-mentioned known methods do not give complete satisfaction. The method which consists in adding a quartz plate suffers from the drawback of giving rise to coupling losses between the plate and the optical waveguides, and the performance of a method using different orders for the TE and TM polarization modes is limited in terms of number of different wavelength channels that can be separated by the filter. Finally, methods that act on the shape of optical waveguides to modify birefringence are technologically difficult to implement.

OBJECTS AND SUMMARY OF THE INVENTION

An object of the present invention is to remedy the above-specified drawbacks and to propose a novel multi-wavelength filter that is insensitive to polarization, that is easy to manufacture, that is suitable for monolithic integration, and that enables a large number of channels to be demultiplexed.

According to the invention, this is achieved by proposing a filter of the type comprising polarization rotators placed on the path of the light in the optical waveguides in such a manner that in each of the optical waveguides, the optical path lengths for the TM and TE polarization modes are equal. In characteristic manner, the polarization rotators are of the type including means for loading each optical waveguide and for creating asymmetry in the effective refractive index thereof.

The invention also provides a method of manufacturing such a filter.

BRIEF DESCRIPTION OF THE DRAWINGS

Other characteristics and advantages of the present invention appear on reading the following detailed description of a non-limiting embodiment of the invention, and, on examining the accompanying drawings, in which:

FIG. 4 is a cross-section of an optical waveguide on section line IV—IV of FIG. 2;

FIG. 5 is a cross-section of an optical waveguide on section line V—V of FIG. 2;

FIG. 6 is a cross-section of an optical waveguide on section line VI—VI of FIG. 2;

FIG. 7 is a cross-section of an optical waveguide on section line VII—VII of FIG. 3;

FIG. 8 is a cross-section of an optical waveguide on section line III—III of FIG. 3; and FIG. 9 is a cross-section of an optical waveguide on section line IX—IX of FIG. 2.

MORE DETAILED DESCRIPTION

Figure 1:
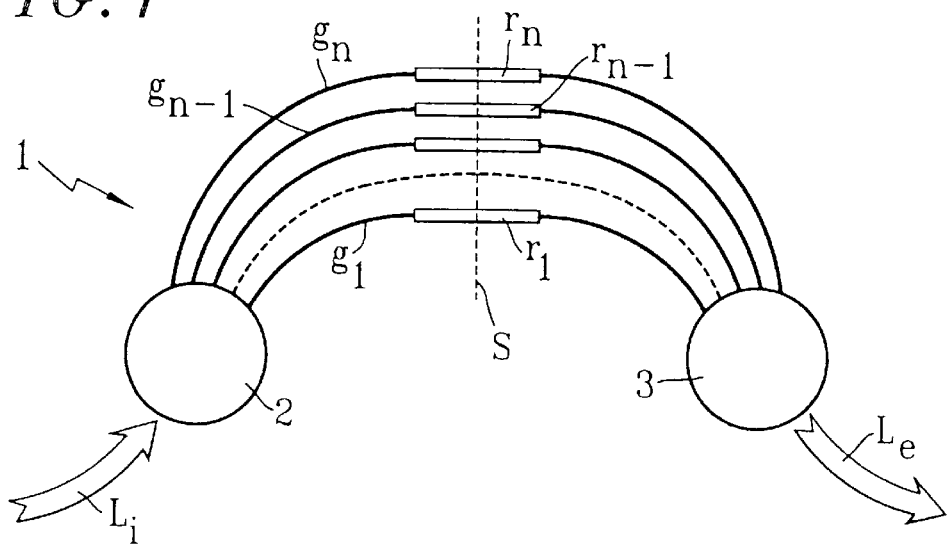
FIG. 1 is a diagrammatic overall view of a multi-wavelength filter having a bundle of optical waveguides.

FIG. 1 is a diagram of a multi-wavelength filter 1 comprising a bundle of $\underline{n}$ optical waveguides $g_1, \ldots, g_n$. These waveguides interconnect two expansion zones 2 and 3 that are constituted in the embodiment described by plane slab waveguides. Only the expansion zone 2 is shown in perspective in FIG. 2.

The filter 1 receives incident light $L_i$ via an optical waveguide 10 that opens out into the expansion zone 2. The light $L_i$ is subdivided into a plurality of light waves propagating in the respective optical waveguides $g_1, \ldots, g_n$. These light waves are recombined in the expansion zone 3 where they interfere. The optical waveguides $g_1, \ldots, g_n$ are of increasing respective lengths and the optical paths travelled by the light waves in the optical waveguides $g_1, \ldots, g_n$ are of different lengths. The light waves are therefore subjected to phase shifting which, after they are recombined in expansion zone 3, gives rise to interference in application of the Mach-Zender principles of interferometry. The wavelength response of the filter thus makes it possible to separate a plurality of channels of different respective wavelengths, and the filter can be used as a demultiplexer in an optical telecommunications network. One or more optical waveguides connect the expansion zone 3 to one or more opto-electronic receiver components (not shown) or to optical fibers for conveying the filtered light to other optical or opto-electronic components.

Polarization rotators $r_1, \ldots, r_n$ are placed on the light path in each of the optical waveguides $g_1, \ldots, g_n$ to make the optical paths travelled by the TE and TM polarization modes respectively of equal length, and to obtain polarization insensitivity for the filter 1.

The polarization rotators $r_1, r_2, \ldots, r_n$ are of the type comprising means for loading each optical waveguide in such a manner as to create asymmetry in the effective refractive index thereof.

The phenomenon of polarization rotation that is obtained by loading an optical waveguide in such a manner as to create asymmetry in its effective refractive index is known per se, and in particular it is described by Y. Shani in the publication "Applied Physics Letters" 59(11), Sep. 9, 1991.

In the embodiment described, each of the optical waveguides $g_1, \ldots, g_n$ extends symmetrically on either side of a midplane of symmetry for the bundle of waveguides. Where it intersects the waveguides, this plane extends perpendicularly to the direction of light propagation.

The multi-wavelength filter 1 has been made by using metal-organic chemical vapor deposition (MOCVC) to deposit the following in a single step by epitaxy on a plane substrate 4 of InP binary material: a 1 μm thick bottom confinement layer 5 of InP binary material; a 0.1 μm thick first guide layer 6 of GaInAsP quaternary material having a forbidden band corresponding to a wavelength $\lambda_g$ equal to 1.3 μm; a 1 μm thick intermediate confinement layer 7 of InP binary material; a 0.1 μm thick second guide layer 8 of GaInAsP quaternary material having a forbidden band corresponding to a wavelength $\lambda_g$ equal to 1.3 μm; and a 1 μm thick top confinement layer 9 of InP binary material. The thickness of each of the guide layers 6 and 8 of InGaAsP quaternary material is less than or equal to 1500 Å and its refractive index is greater than that of the confinement layers 5, 7, and 9. Given the above values, the total thickness of the bottom confinement layer 5, the intermediate confinement layer 7, and the top confinement layer 9 is about 3 μm.

To make the optical waveguide 10 serving to convey the incident light $L_i$ to the expansion 2, the top confinement layer 9 is etched to form a ribbon 11 that is 4 μm wide in the embodiment described. The expansion zone 2 is made by etching the top confinement layer 9 beside the optical waveguide 10 and by etching more deeply to the guide layer 6 beside the optical waveguides $g_1, \ldots, g_n$. Likewise, the optical waveguide(s) used for guiding the light leaving the expansion zone 3 is/are made by etching the top confinement layer 9 to form one or more guide ribbons. The expansion zone 3 is made by etching the top confinement layer 9 beside the optical waveguide(s) and by etching more deeply down to the guide layer 6 beside the optical waveguides $g_1, \ldots, g_n$. Naturally, it would not go beyond the ambit of the invention to provide a plurality of optical waveguides for bringing light to the expansion zone 2.

The optical waveguides $g_1, \ldots, g_n$ are made by removing the top confinement layer 9, the guide layer 8, and the intermediate confinement layer 7. In the example described, this removal of matter is performed in known manner by dry etching (RIE, RIBE, or IBE).

Each waveguide $g_k$ of the bundle (where k is an integer in the range 1 to n) has end portions referenced 12 connected to the expansion zones 2 and 3, and between said end portions 12 it has rectilinear portions referenced 13 and one or more curved portions 91 interconnecting said rectilinear portions. The structure of each optical waveguide $g_k$ is of the "diluted" type, having birefringence of the order of $5 \times 10^{-3}$, with light propagating in a broad mode in the guide layers 6 and 8.

Figure 2:
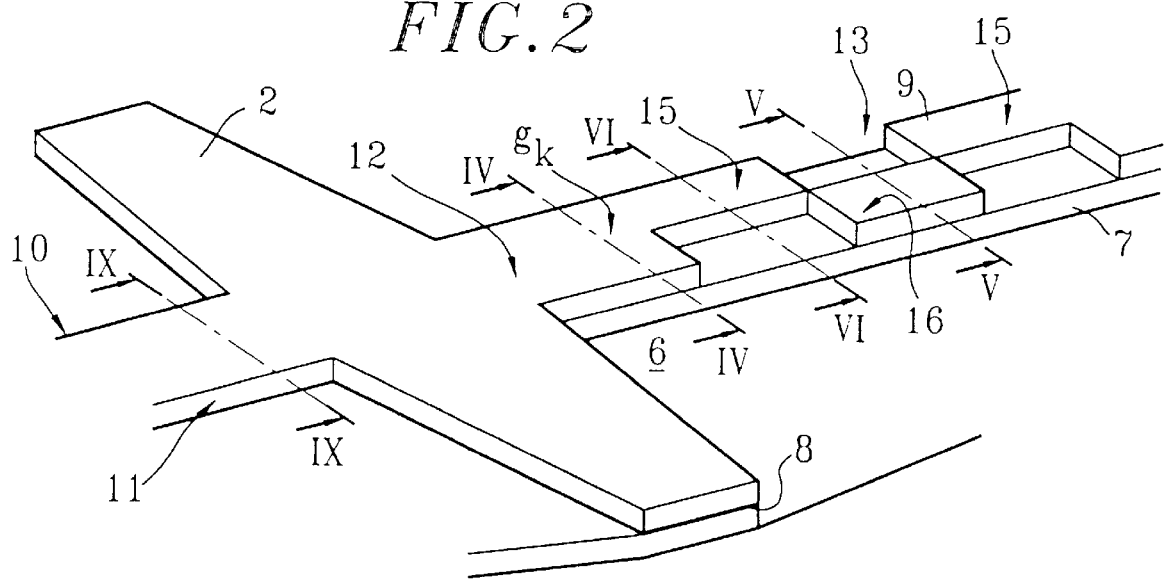
FIG. 2 is a fragmentary diagrammatic perceptive view of a multi-wavelength filter of the invention showing a rectilinear portion of optical waveguide.
Figure 3:
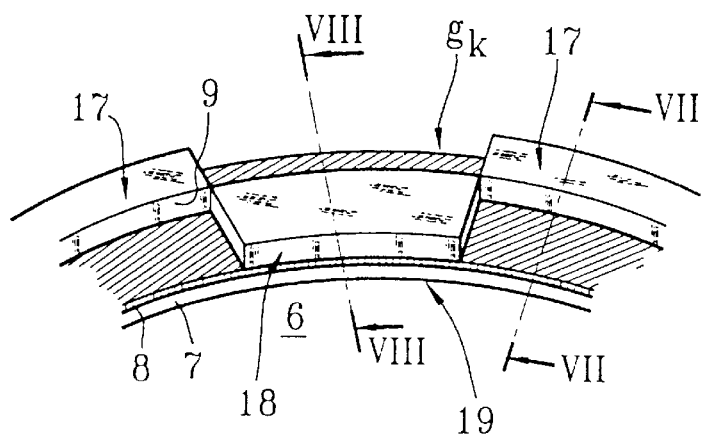
FIG. 3 is a fragmentary diagrammatic view in perspective of a curved portion of optical waveguide.

To make a polarization rotator $r_k$ on a rectilinear portion 13 of a waveguide $g_k$, the top confinement layer 9 is etched in a special way. More precisely, as shown in FIGS. 2, 5, and 6, the top confinement layer 9 is etched so as to make a succession of alternating patterns 15 and 16 deposited on either side of a mid surface P associated with the corresponding optical waveguide $g_k$, and having a generator line that is perpendicular to the plane of the layers. Each of the alternating patterns 15 and 16 has a width L that is half the width of the waveguide $g_k$, i.e. in the embodiment described the width L is equal to 2 μm. In bends, the structure of the rotator $r_k$ is asymmetrical, with the alternating patterns no longer being of a width equal to half of the width of the waveguide. More precisely, as shown in FIGS. 3, 7, and 8, the top confinement layer 9 is etched in the curved portions 19 of each waveguide $g_k$ in such a manner as to make a succession of alternating patterns 17 and 18 disposed on either side of a surface P' having its generator line perpendicular to the plane of the layers. The patterns 18 situated on the concave side of the bend are of width L' that is greater than half the width of the waveguide, while the patterns 17 situated on the opposite side are of width L" that is less than half the width of the waveguide. In the end portions 12, the top confinement layer 9 extends over the entire width of the waveguide, which is equal to 3 μm in the embodiment described.

The lengths of the alternating patterns 15, 16, 17, and 18 are the same for all of the optical waveguides $g_k$ under consideration. These lengths are equal to $\lambda/(n_{TE}-n_{TM})$ where $n_{TE}$ and $n_{TM}$ designate the effective refractive indices depending on polarization and the type of structure concerned: structure loaded (by the patterns 16 and 18) on the concave side of the bundle of waveguides; or structure loaded (by the patterns 15 and 17) on the opposite side. Each pattern performs a fraction of the polarization rotation required in the optical waveguide concerned in order to permute the TE and TM polarization modes so as to ensure that the optical paths travelled by the TE and TM polarization modes are of equal length. By permuting the TE and TM polarization modes in this way, the central wavelengths of the filter for the TE and TM polarization modes are equal:

$$\lambda_{OTE} = (\tfrac{1}{2} n_{TE} \Delta L + \tfrac{1}{2} n_{TM} \Delta L)/m$$

$$\lambda_{OTM} = (\tfrac{1}{2} n_{TM} \Delta L + \tfrac{1}{2} n_{TE} \Delta L)/m$$

where $\Delta L$ is the difference in length between two consecutive optical waveguides ($g_{k+1}, g_k$) in the bundle of optical waveguides $g_1, \ldots, g_n$, and m is the diffraction order.

Finally, the invention makes it possible to obtain a multi-wavelength filter that is insensitive to polarization, and that is suitable for being integrated within a monolithic structure with other optical or opto-electronic components (since the disturbing structures that serve to obtain the variations in the effective refractive index of the optical waveguides are made out of the same materials as the remainder of the filter).

The invention is not limited to the embodiment described above. In particular, the diluted type structure may be replaced by a non-diluted type structure having an effective refractive index close to the index of the substrate so as to obtain small birefringence (relative to the substrate).

I claim:

1. A multi-wavelength filter (1) that is insensitive to polarization, comprising a bundle of optical waveguides made on a common substrate and organized in such a manner that the wavelength response of the filter depends on the phase shifting to which the light propagating in the waveguides is subject, the filter further comprising polarization rotators placed on the path of the light in the waveguides in such a manner that in each of the optical waveguides, the optical paths for the TE and TM polarization modes are of equal length, wherein the polarization rotators are of the type including means for loading each optical waveguide and for creating asymmetry in the effective refractive index thereof.

2. A filter according to claim 1, in which each optical waveguide travels around at least one bend, and wherein said means for loading each optical waveguide comprises a succession of alternating patterns, each consecutive alternating pattern in the region of the bend being made asymmetrical to its adjacent pattern relative to a mid plane of the waveguide which has a generator line that is perpendicular to a plane containing said bend.

3. A filter according to claim 1, wherein each optical waveguide of the filter comprises the following stack of layers deposited by epitaxy:

a substrate;

a bottom confinement layer;

a bottom guide layer of refractive index greater than that of the bottom confinement layer;

an intermediate confinement layer of refractive index lower than that of the bottom guide layer;

a top guide layer of refractive index greater than that of the intermediate confinement layer; and a top confinement layer of refractive index less than that of the top guide layer.

4. A filter according to claim 3, wherein said means for loading each optical waveguide are implemented by etching the top confinement layer.

5. A filter according to claim 3, wherein the bottom and top guide layers are made of InGaAsP quaternary material, and the bottom, intermediate, and top confinement layers are made of InP binary material.

6. A filter according to claim 5, wherein the thickness of each guide layers is less than or equal to 1500 Å.

7. A filter according to claim 5, wherein the total thickness of the bottom, intermediate, and top confinement layers is about 3 μm.

8. A filter according to claim 5, wherein the quaternary material used has a forbidden band wavelength equal to 1.3 μm.

9. A filter according to claim 1, wherein the birefringence of each optical waveguide is about $5 \times 10^{-3}$.

10. A method of making a multi-wavelength filter that is insensitive to polarization, the method comprising the following steps:

a stack of alternating layers is deposited by epitaxy to constitute a core for guiding light; and the following are etched on said stack: two expansion zones; a bundle of optical waveguides interconnecting said expansion zones; at least one waveguide for bringing light to one of the expansion zones and at least one waveguide for taking light from the other expansion zone; and a set of patterns for loading the optical waveguides in such a manner as to create asymmetry in the effective refractive index within each optical waveguide of the bundle, said asymmetry giving rise to rotation of light polarization.

11. A filter according to claim 1, in which each optical waveguide travels around at least one bend, and wherein said means for loading each optical waveguide comprise a succession of alternating patterns disposed on one of a concave and a convex side of the bend, the patterns situated on the concave side of the bend being of a width that is greater than half the width of the waveguide, and the patterns situated on the convex side of the bend being of a width that is less than half the width of the waveguide.

12. A multi-wavelength filter that is insensitive to polarization, comprising a bundle of optical waveguides made on a common substrate and organized in such a manner that a wavelength response of the filter depends on a phase shifting to which light propagating in the waveguides is subject, the filter further having polarization rotators placed on the path of the light in the waveguides in such a manner that in each of the optical waveguides, the optical paths of the TE and TM polarization modes are of equal length, wherein the polarization rotators are of the type including means for loading each optical waveguide and for creating asymmetry in the effective refractive index thereof and wherein each optical waveguide travels around at least one bend, and wherein said means for loading each optical waveguide includes a succession of alternating patterns, each consecutive alternating pattern in the region of the bend being made asymmetrical to its adjacent pattern relative to a mid plane of the waveguide, the mid plane having a generator line that is perpendicular to a plane containing said bend.

* * * * *